United States Patent [19]

Bausch

[11] Patent Number: 4,955,443

[45] Date of Patent: Sep. 11, 1990

[54] MOTOR VEHICLE WITH ALL-WHEEL STEERING

[75] Inventor: Paul Bausch, Hattenheim, Fed. Rep. of Germany

[73] Assignee: General Motors Corporation, Detroit, Mich.

[21] Appl. No.: 305,322

[22] Filed: Feb. 1, 1989

[30] Foreign Application Priority Data

Feb. 5, 1988 [DE] Fed. Rep. of Germany ....... 3803466

[51] Int. Cl.⁵ .............................................. B62D 7/14
[52] U.S. Cl. .................................. 180/79.1; 180/142; 280/91
[58] Field of Search ...................... 180/79.1, 140, 142; 280/91

[56] References Cited

FOREIGN PATENT DOCUMENTS

| 0221547 | 11/1986 | European Pat. Off. ........... 180/79.1 |
| 0239327 | 9/1987 | European Pat. Off. ........... 180/79.1 |
| 3139792A1 | 4/1983 | Fed. Rep. of Germany . |
| 60-146708 | 12/1985 | Japan . |
| 60-161262 | 12/1985 | Japan . |
| 0131874 | 6/1987 | Japan ................................. 180/79.1 |

Primary Examiner—Charles A. Marmor
Assistant Examiner—Alan M. Kagen
Attorney, Agent, or Firm—Saul Schwartz

[57] ABSTRACT

The invention pertains to a motor vehicle with all-wheel steering, comprising a steerable front axle and a steerable rear axle. Associated with the steerable rear axle is an electrical steering gear that can be acted upon by an electronic control unit to turn the rear wheels of the rear axle out of their straight-ahead position. An additional, separate steering device independent of the electrical steering gear, is associated for this purpose with each rear wheel.

2 Claims, 3 Drawing Sheets

MOTOR VEHICLE WITH ALL-WHEEL STEERING

FIELD OF THE INVENTION

The invention pertains to a motor vehicle with all-wheel steering, which comprises a steerable front axle and a steerable rear axle, with an electrical steering gear, which can be acted upon by an electronic steering unit, associated with the rear axle to turn the rear wheels of the rear axle from their straight-ahead position.

BACKGROUND OF THE INVENTION

In motor vehicles of this type, in which the rear axle is also actively steered to improve steerability in tight curves and especially during parking, the rear wheels are only steered in the same direction, with the steering of the rear wheels either depending or not depending on the steering of the front wheels.

All that can be done with such motor vehicles, therefore, is to reduce the turning circle. Improvements in steering characteristics in long, gentle curves, as often occur especially during highway driving, cannot be achieved in this manner.

EP-OS 0221547 discloses a steering angle adjustment device for a steerable front axle in which the front wheels, retained on the front axle beam by control arms, are steered in the usual way with tie rods and steering arms. Provided to mount the control arm on the front axle beam are first control arm bearings accommodating a slight horizontal pivot motion and second control arm bearings located along the long axis of the vehicle, offset from the first control arm bearings, and serving as hydraulic positioning elements, by means of which the linking points of the wheels to the axle beams can be shifted outward or inward with respect to the long axis of the vehicle.

With this known front axle, the steering angle of the front wheels, namely, the angle through which the front wheels are pivoted out from their straight-ahead position during steering, is corrected by the fact that the linking points of the front wheels on the control arm bearings are shifted by the steering angle set by the standard steering system and by the lateral forces occurring at the front wheels, so as to optimize the steering angle of the front wheels in terms of slip angle and cornering force.

With this known device for adjusting the front wheels' steering angle, the latter can be optimized for good steering characteristics, but no additional influence on the steering characteristics of the motor vehicle can be achieved with this known device.

On the other hand, the problem on which the invention is based is that of creating a motor vehicle of this type with all-wheel steering, in which, in addition to a reduced turning circle, steering characteristics at small steering angles and tracking are also improved.

SUMMARY OF THE INVENTION

According to the invention, this problem is solved by the fact that an additional, separate steering device independent of the electrical steering gear is associated with each rear wheel.

Because of the additional, mutually independent steering devices provided according to the invention for each rear wheel, the measures to improve steerability during parking can be separated from the measures to optimize driving and steering characteristics during straight-ahead driving or in long curves with large radii of curvature, so that the correction measures for these different driving conditions can in each case be selected optimally for themselves. This makes possible, in particular, a simplification of the control electronics and electrical steering gear for the rear axle.

A development of the invention provides for each additional steering device to comprise a final control element, each of which pivots a control arm of the associated rear wheel. This makes it possible to implement the control devices, which are independent of the electrical control drives for the rear axle, with a particularly simple design, since a rear axle design consisting of standard components can be used, except for the final control element. This makes it possible for the costs for the additional steering devices to be kept very low.

A particularly preferred embodiment of the invention provides for each of the control arms to be supported on the rear axle beam by a first control arm bearing which accommodates a horizontal pivoting motion and by a second control arm bearing which in each case acts as a final control element, with the final control elements being hydraulically actuated.

The result is that, in addition to the simple design of the steering devices, energy sources already present in the motor vehicle can be used, with no additional load on the electrical system of the motor vehicle.

A further development of the invention provides for a hydraulic control device to be provided for actuation of the hydraulic final control elements, which is acted upon by the electronic control unit. The result of this is that the same electronic control unit can be used to control the additional steering device, namely, to actuate the hydraulic final control element, as is used for the electrical steering gear on the rear axle.

In this context, the rear wheels can, on the one hand, be steered in the same direction, in a known manner, by means of the electrical steering gear, as is necessary especially for slow driving at speeds of less than ca. 40 km/h and at large steering angles. On the other hand, however, the rear wheels in particular can also be individually or oppositely turned out of their straight-ahead position by means of the final control elements controlled by the electronic control unit by means of the hydraulic control device.

To make it possible to steer the rear wheels in rapidly changing driving situations with corresponding speed and precision by means of the hydraulic final control elements, another development of the invention provides for each hydraulic final control element to comprise a first and second pressure chamber which can be selectively connected, by means of electromagnetically actuated 3/2-way valves of the hydraulic control device, with a hydraulic pressure source or a hydraulic fluid reservoir.

Another embodiment of the invention has the provision that switching signals for the electromagnetically actuated 3/2-way valves can be sent to the hydraulic control device for selective pressurization of the individual pressure chambers of the final control elements of the electronic control unit, according to a braking signal and transverse acceleration signals, with the braking signal and the transverse acceleration signals being generated by corresponding sensors.

Because of the fact that the hydraulic final control elements are controlled according to a braking signal and transverse acceleration signals, the tracking of the vehicle can be significantly improved both during braking and in long curves. In addition, in accordance with the braking signal, namely, as soon as the vehicle is braked, both rear wheels can be oppositely caused to toe-in, thus largely preventing the rear of the vehicle from swerving laterally. In addition, in curves, where transverse acceleration signals occur, the respective wheel on the outside of the curve can be given increased toe-in, generating a tendency to understeer which considerably improves the steerability of the vehicle, especially during high-speed driving.

In a motor vehicle according to the invention that is equipped with a baking system actuated by an ABS device, the invention furthermore provides for the speed sensors of their ABS device associated with the individual vehicle wheels to be connected to the electronic control unit. This makes it possible, during braking with a so-called μ-split, namely, during braking on a partly non-slip and partly slippery or smooth road, where the right vehicle wheels, for example, are running on a smooth or slippery surface and the left vehicle wheels on a non-slip surface, for swerving of the vehicle to be prevented, in addition to the optimization of braking provided by the ABS device, by moving the rear wheel which is running on a non-slip surface towards greater toe-in. This attenuates the yaw torque generated by the difference in braking effect on the right and left sides of the vehicle.

An additional embodiment of the invention is characterized by the fact that each hydraulic bearing acting as a final control element has an inner bushing which is placed coaxially in an outer bushing serving as a fastening element, in which a normally coaxially oriented fastening bolt is provided, which is retained on the inner bushing by means of partitions delimiting the pressure chambers from one another and annular elements sealing off the pressure chambers at their axial ends.

This makes it possible to substantially reduce the wear on the hydraulic control arm bearings which act as final control elements, so that they exhibit increased service life, since pivoting motions of the rear axle control arm about an axis parallel to the long axis of the vehicle, such as occur when the rear wheels deflect up or down, are absorbed between the inner and outer bushings of the hydraulic control arm bearing, with no need for the elements of the control arm bearing, required for lateral displacement or for pivoting of the control arm about a vertical axis, to absorb significant shear forces.

To make it particularly easy to act upon the hydraulic control arm bearings with pressurized hydraulic fluid, another example of an embodiment of the invention provides that the pressure chambers can be pressurized with hydraulic fluid through holes provided in the fastening bolt.

BRIEF DESCRIPTION OF THE DRAWINGS

The invention will be explained in more detail below by means of examples, with reference to the drawing, in which.

In various figures of the drawing, corresponding components are labeled with the same reference numbers.

DESCRIPTION OF THE PREFERRED EMBODIMENT

Figure 1:
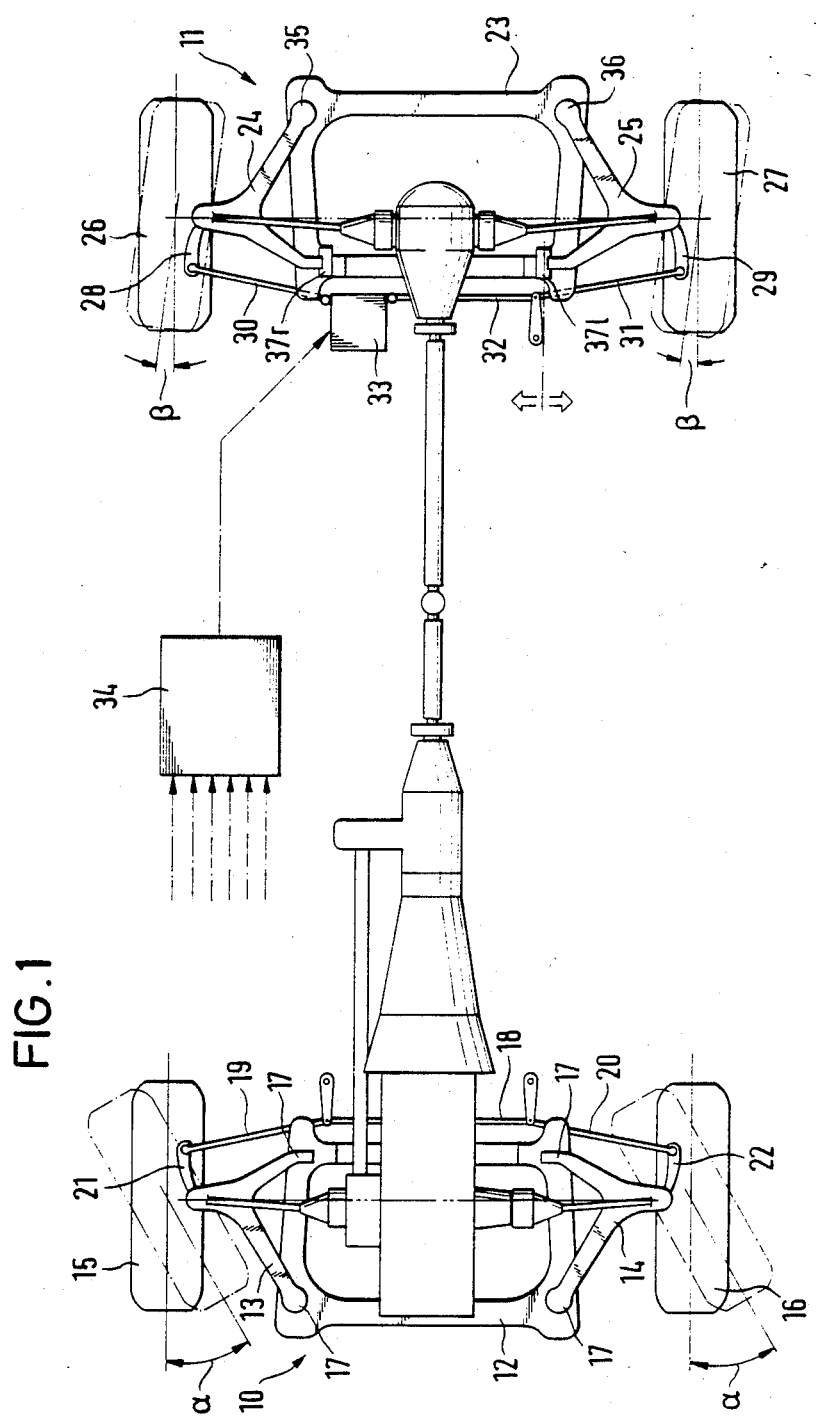
FIG. 1 shows a schematic illustration of a motor vehicle chassis with a steerable rear axle.

As FIG. 1 shows, the chassis of a motor vehicle comprises a steerable front axle 10 and a steerable rear axle 11. The front axle 10 has a front axle beam 12 on which the control arms 13,14 for the right and left front wheels 15 and 16 are supported by means of control arm bearings 17. The front wheels 15,16 are rotatably connected in the usual way, by means of steering knuckles (not shown) to the control arms 13 and 14.

To steer the front wheels, a steering device (not shown in greater detail) is provided, which is connected by means of tie rods 19,20 to one steering knuckle arm each 21,22 for the right and left front wheel 15,16.

The rear axle 11, which is constructed from a correspondingly modified front axle, has a rear axle beam 23 on which the control arms 24,25 for a right and a left rear wheel 26,27 are supported, with the rear wheels connected to the control arms 24,25 by steering knuckles (not shown). A steering knuckle arm 28,29 extends forward from the steering knuckle for each rear wheel 26,27 and is connected at its forward end to a rear axle tie rod 30,31.

Placed between the two rear axle tie rods 30,31 is a drag link 32, which is acted upon by an electrical steering gear 33.

The electrical steering gear 33 is acted upon by an electronic control unit 34 to which a speed signal, a braking signal, an ABS signal, a steering angle signal and a right and left transverse acceleration signal are conveyed by corresponding sensors (not shown).

Figure 2:
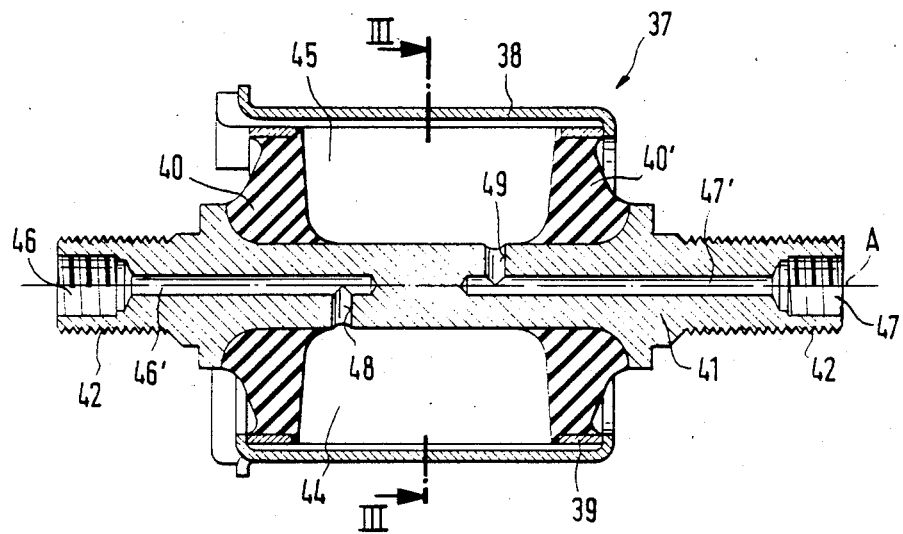
FIG. 2 shows a longitudinal section through a hydraulic control arm bearing for a steerable rear axle.
Figure 3:
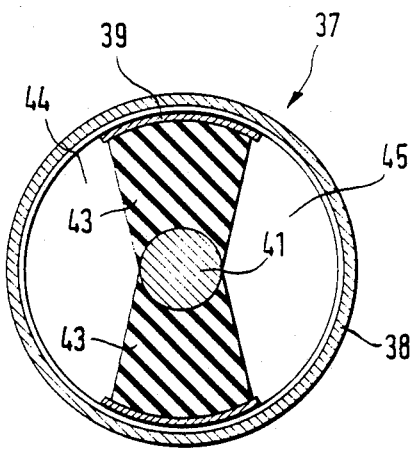
FIG. 3 shows a section rotated through 90°, essentially along line 3—3 in FIG. 2.

The control arms 24,25 of the rear axle 11 are attached at their rear linkage points on the rear axle beam 23 with conventional control arm bearings 35,36; these control arm bearings allow, in addition to the usual pivoting of the control arms 24,25 as the rear wheels 26,27 deflect up or down, a limited pivoting of the control arms 24,25 about shafts each standing perpendicularly on the rear axle beam 23. At the front linkage points of the control arms 24,25, between the latter and the rear axle beam 23, are provided hydraulic control arm bearings 37r and 371, which will be described in more detail below with reference to FIGS. 2 and 3.

The hydraulic control arm bearing 37 comprises an outer bushing 38, into which an inner bushing 39 is tightly inserted. The inner bushing 39 has, at each axial end, a rubber annular element 40 or 40' extending radially inward, the outer circumference of which fits tightly against the inner bushing 39.

Along the longitudinal center axis A of the hydraulic control arm bearing 37, a fastening bolt 41 extends through the annular elements 40,40', the inner circumferential surfaces of which are applied flush against the fastening bolt 41. As FIG. 3 indicates, partitions 43 made of an elastic rubber material are provided, diametrically opposite one another, between the fastening bolt 41 and the inner bushing 39, extending axially from one annular element 40 to the other annular element 40' and thus dividing the interior of the hydraulic control arm bearing into a first and a second pressure chamber 44,45.

Provided in the end surfaces of the fastening bolt 41 are delivery connections 46,47, from which axial blind holes 46',47' extend into the fastening bolt 41, each connected at its inner end, through radial bores 48,49 with the first and second pressure chambers 44,45, respectively.

Screw threads 42 are provided on the axial ends of the fastening bolt 41 to fasten it to the rear axle beam 23, so that the hydraulic control arms 37 can be screwed onto the rear axle beam 23. The control arms 24,25 are then fastened onto the outer bushing 38. Conversely, however, it is also possible to attach the rear axle beam 23 to the outer bushing 38, while the control arms 24,25 are each attached to the fastening bolt 41 of the hydraulic control arm bearing 37.

Figure 4:
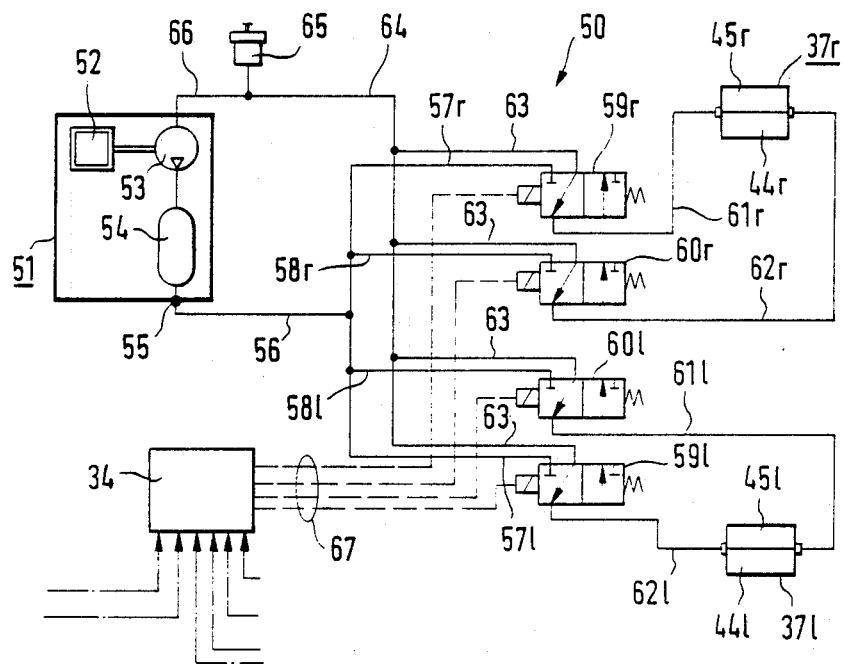
FIG. 4 shows a schematic hydraulic circuit diagram for the hydraulic control arm bearings of the rear axle in FIG. 1.

FIG. 4 shows a hydraulic control device 50 for the right and left hydraulic control arm bearings 37r and 371, respectively. The hydraulic control device 50 has a hydraulic pressure source 51 with a hydraulic pump 53, acted upon by a pump motor 52, which supplies a pressure reservoir 54. A pressure outlet 55 of the hydraulic pressure source 51, acted upon by the pressure reservoir, is connected through a pressure line 56 with pressure lines 57r,571, 58r,581, which are connected through electromagnetically actuated 3/2-way valves 59r,591 and 60r,601 with the connector lines 61r,611 and 62r,621 leading to the first and second pressure chambers 44r,441 and 45r,451 of the hydraulic control arm bearings 37r and 371, when the 3/2-way valves 59r,591and 60r,601 are in their second setting.

As long as the 3/2-way valves 59r,591 and 60r, 601 are in their first setting illustrated in FIG. 4, the connection lines 61r,611 and 62r,621 are connected through return lines 63 to a return collector line 64, which leads to a hydraulic fluid reservoir 65, which supplies the hydraulic pressure source 51 through a feed line 66.

To actuate the hydraulic control arm bearings 37r,371, the electromagnetically actuated 3/2-way valves 59r,591, 60r,601 are connected to the electrical control unit 34 by means of signal conductors 67.

The steering device described above operates as follows:

For driving on curves and parking the motor vehicle, the front wheels 15,16 are rotated about their steering knuckle in the usual way by the steering device 18, acted upon in a known manner by a steering wheel (not shown), by means of the tie rods 19,20 and the steering knuckle arms 21,22, so that the front wheels 15,16 are turned out of their straight-ahead position by a desired steering angle $\alpha$. At vehicle speed of less than ca. 40 km/h and a steering wheel rotation angle greater than 250°, to reduce the turning circle, the rear wheels 26,27 are turned by the electrical steering gear 33 through a fixed steering angle $\beta$, which is approximately 5° to 7°. Conversely, as the drawing shows, when the front wheels 15,16 are turned to the right, there is a turning of the rear wheels 26,27 to the left.

In this process, the electrical steering gear 33 is controlled by the electronic control unit 34, to which a steering angle is signal and a speed signal are sent.

If the vehicle is traveling faster than 40 km/h or if the steering wheel angle is less than ca. 250°, the rear wheels 26,27 are not steered by the electrical steering gear 33.

To allow improvements in the driving characteristics of the vehicle even at speeds greater than ca. 40 km/h and at a steering wheel angle of less than ca. 250°, the control arms 24,25 of the rear axle 11 can be pivoted slightly about the rear control arm bearings 35 and 36 by means of the front, hydraulic control arms bearings 37r,371. In this process, the suspension point of the rear wheels 26,27 at the control arms 24 and 25 is shifted with respect to the linkage points of the rear axle tie rods 30 and 31 at the steering knuckle arms 28 and 29, so that the track of the rear wheels 26,27 is thus adjusted.

If, for example, the front suspension point of the right control arm 24 is shifted outward by means of the hydraulic control arm bearing 37r, the steering knuckle of the right rear wheel 26, retained at the control arm 24, is also shifted outward, while the linkage point of the rear axle tie rod 30 at the steering knuckle arm 28 remains fixed with respect to the long axis of the vehicle, so that the rear wheel 26 toes in.

To effect this small turning or track adjustment of the rear wheels 26, the electronic control unit 34 sends, through the corresponding signal conductor 67, a control signal to the electromagnetic 3/2 way valve 60r, which thereupon is switched over to its second setting, in which it connects the pressure chamber 45r with the pressure source 51. The pressure chamber 45r is thus filled with hydraulic fluid, while the fluid is displaced out of the second pressure chamber 44r of the hydraulic control arm bearing 37r, through the connection line 61r, the associated 3/2-way valve 59r and the reflux lines 63,64 to the reservoir 65. As a result, the outer bushing 38 is displaced to the right of the fastening bolt 41, with respect to the direction of motion of the vehicle or upward in FIG. 2. Since it is assumed here that the fastening bolt 41 is fastened to the rear axle beam 23, while the outer bushing 38 carries the control arm 24, the control arm 24 is pivoted to the right, so that the rear wheel 26 toes in.

To cause the rear wheel 26 to toe out, the other pressure chamber 44r is correspondingly pressurized through the associated 3/2-way valve 59r, while the pressure chamber 45r is connected to the hydraulic fluid reservoir 65.

By means of suitable control signals from the electronic control unit 34, it is thus possible to turn the two rear wheels 26,27, both individually and simultaneously, to a toed-in or toed-out position; it is even possible for one of the rear wheels 26,27 to toe in while the other 27,26 is made to toe out.

To increase the general straight-ahead stability of the vehicle during braking, the electronic control unit 34, in the presence of a braking signal, delivers corresponding control signals to the hydraulic control drive 50, which, by switching the corresponding 3/2-way valves 60r,59l, then causes pressurization of the pressure chambers 45r and 44l, so that both rear wheels 26,27 are toed in.

On curves where the steering wheel angle is less than 250°, in accordance with a steering angle signal sent to the electronic control unit 34, only the rear wheel on the outside of the curve, namely, the right wheel 26 in the case of a left-hand curve, is given more toe-in, thus generating a tendency to understeer.

If transverse accelerations then occur, which are detected by corresponding transverse acceleration sensors (not shown) for right and left, the electronic control unit 34, to which the transverse acceleration signals are sent, then correspondingly controls the hydraulic control device 50 above a certain transverse acceleration.

For example, if a correspondingly large transverse acceleration to the right occurs at the rear of the vehicle, namely, if the rear of the vehicle threatens to swerve out, the electronic control unit 34 then controls the hydraulic control device 50 such that the right rear wheel is toed in and the left rear wheel is toed out. This counteracts the transverse acceleration of the rear to the right.

Furthermore, the straight-ahead stability of the vehicle can also be improved during braking on a so-called $\mu$-split, namely, during braking on a road on which, for example, the left wheels are running on a dry surface with high friction, and the right wheels of the vehicle on a wet or icy road with little friction. In this context, the electronic control unit 34 recognizes, on the basis of the ABS signals delivered by an ABS system, that the vehicle is braking on a $\mu$-split, and thus causes the rear wheel that is running on the higher-grip road surface, in this example the left wheel 27, to toe out. To do so, the electronic control unit 34 sends switching signals to the electromagnetically actuated 3/2-way valves 59l,60l, so that the right pressure chamber 45l of the hydraulic control arm bearing 37l associated with the left rear wheel 27 is connected to the hydraulic pressure source 51, while the left pressure chamber 44l is connected to the reservoir 65. The outer bushing 38 thus shifts to the right with respect to the fastening bolt 41 of the hydraulic control arm bearing 37l and thus causes a toe-out setting of the left rear wheel 27. The right rear wheel 26 remains toed in, as for braking on a dry road. The yaw torque generated during braking on a $\mu$-split, which would cause the vehicle to twist to the right, is thus counteracted.

The embodiments of the invention in which an exclusive property or privilege is claimed are defined as follows:

1. A method of steering a vehicle, said vehicle including:
    a steering wheel rotatable by a driver through a plurality of steering wheel angles,
    a front steering system connected to said steering wheel, and
    a rear steering system including
    a first rear steering means for steering a pair of rear wheels of said vehicle only in unison in the same direction by an electric motor operated actuator of said first rear steering means, and
    a second rear steering means for steering each rear wheel of said pair of rear wheels independently of the other rear wheel of said pair of rear wheels and independently of said first rear steering means,
    said method comprising the steps of:
    sensing the velocity of said vehicle,
    sensing said steering wheel angle,
    steering said pair of rear wheels only by said first steering means in opposite phase relative to said front steering system when vehicle velocity is less than a predetermined velocity and steering wheel angle exceeds a predetermined steering wheel angle,
    steering each rear wheel of said pair of rear wheels only by said second steering means when vehicle velocity exceeds said predetermined velocity and said steering wheel angle is less than said predetermined steering wheel angle,
    sensing the actuation of a braking system of said vehicle, and
    oppositely steering each rear wheel of said pair of rear wheels by said second steering means so that each rear wheel of said pair of rear wheels toes-in when said braking system is actuated at vehicle velocities exceeding said predetermined velocity and at steering wheel angles less than said predetermined steering wheel angle.

2. A method of steering a vehicle, said vehicle including:
    a steering wheel rotatable by a driver through a plurality of steering wheel angles,
    a front steering system connected to said steering wheel, and
    a rear steering system including
    a first rear steering means for steering a pair of rear wheels of said vehicle only in unison in the same direction by an electric motor operated actuator of said first rear steering means, and
    a second rear steering means for steering each rear wheel of said pair of rear wheels independently of the other rear wheel of said pair of rear wheels and independently of said first rear steering means,
    said method comprising the steps of:
    sensing the velocity of said vehicle,
    sensing said steering wheel angle, steering said pair of rear wheels only by said first steering means in opposite phase relative to said front steering system when vehicle velocity is less than a predetermined velocity and steering wheel angle exceeds a predetermined steering wheel angle, steering each rear wheel of said pair of rear wheels only by said second steering means when vehicle velocity exceeds said predetermined velocity and said steering wheel angle is less than said predetermined steering wheel angle, sensing lateral acceleration of said vehicle, and steering each rear wheel of said pair of rear wheels by said second steering means in unison with and in the same direction as the other wheel of said pair of rear wheels and in the same phase relative to said front steering system when lateral acceleration exceeds a predetermined lateral acceleration at vehicle velocities exceeding said predetermined velocity and at steering wheel angles less than said predetermined steering wheel angle.

* * * * *